United States Patent [19]
Jones

[11] Patent Number: 6,116,176
[45] Date of Patent: Sep. 12, 2000

[54] DRAG REDUCTION ASSEMBLY FOR USE WITH A BOAT HULL

[76] Inventor: Craig S. Jones, 165 N. Gratio, Mount Clemens, Mich. 48043

[21] Appl. No.: 09/375,883

[22] Filed: Aug. 17, 1999

[51] Int. Cl.[7] ................................................. B63B 1/34
[52] U.S. Cl. ................................... 114/67 R; 440/95
[58] Field of Search ...................... 114/67 R, 67 A; 440/95

[56] References Cited

U.S. PATENT DOCUMENTS

| | | | |
|---|---|---|---|
| 532,221 | 1/1895 | Thomas | 114/67 R |
| 1,840,725 | 1/1932 | Lake | 114/67 R |
| 3,621,803 | 11/1971 | Foster | 114/67 R |
| 4,233,920 | 11/1980 | Wood et al. | 114/291 |
| 4,843,988 | 7/1989 | Clement | 114/291 |
| 5,191,853 | 3/1993 | Adler | 114/291 |
| 5,443,026 | 8/1995 | Wenstadt et al. | 114/288 |
| 5,452,676 | 9/1995 | Fiore | 114/291 |
| 5,575,232 | 11/1996 | Kato et al. | 114/67 A |
| 5,619,945 | 4/1997 | Nedderman et al. | 114/67 A |
| 5,685,253 | 11/1997 | Alexander, Jr. | 114/291 |
| 5,787,829 | 8/1998 | Oshima | 114/67 A |

*Primary Examiner*—Jesus D. Sotelo
*Attorney, Agent, or Firm*—Gifford, Krass, Groh, Sprinkle, Anderson & Citkowski, P.C.

[57] ABSTRACT

A drag-reduction system incorporated within an inwardly stepped underside of a boat hull for reducing a degree of water pressure forces exerted upon the boat hull during travel of the boat upon a body of water. A plurality of spaced apart rollers are secured at a generally aft location of the boat hull associated with the inwardly stepped underside and extend in parallel spaced apart fashion and perpendicularly to a longitudinal water flow across the boat hull experienced during propulsion of the hull. An elongate and planar shaped belt of a water impervious material having an established width and defining a continuous extending and closed loop is mounted over the plurality of spaced apart rollers. A first linearly extending location of the continuous belt is recessed within the stepped underside of the hull and a second linearly extending location is in contact with the longitudinal water flow. The second linearly extending location of the belt is capable of being translated in a direction consistent with the longitudinal water flow across the boat hull. A single drive roller or pair of drive rollers associated with the plurality of spaced apart rollers is capable of driving the belt at a velocity equal to or greater than a velocity of the longitudinal water flow traveling along the boat hull.

20 Claims, 5 Drawing Sheets

DRAG REDUCTION ASSEMBLY FOR USE WITH A BOAT HULL

BACKGROUND OF THE INVENTION

1. Field of the Invention

The present invention relates generally to drag reduction technology for application to a hull of a boat and, more particularly, to a drag reduction assembly incorporated within a boat hull, particularly a stepped boat hull configuration, which provides for more efficient operation of the boat when traveling upon or through a body of water.

2. Description of the Prior Art

Technology is fairly well known in the marine art for assisting in the reduction of frictional water forces, or drag forces, experienced by a boat hull during its travel along or through a body of water. Such forces are in the form of resistant forces to the forward movement of the boat. Significant drag or frictional forces are often exerted on the propeller and the planar surfaces of the hull.

U.S. Pat. No. 5,685,253, issued to Alexander, Jr., teaches a vee bottom stable planning boat employing a drag reduction configuration. The vee portion of the hull includes a plurality of spray root lines where solid water contacts the bottom of the boat. Boat drag is minimized at higher speeds by adjusting the trim angle of the hull.

An additional variation of a vee hull construction is illustrated in U.S. Pat. No. 4,233,920, issued to Wood et al., which teaches provision of a concave running pad at a central aft location of the underside vee hull. Air is inducted into the running pad to reduce hull drag in combination with angling of a transom to terminate at a transverse hull step and which permits the outboard propulsion unit to be carried higher reducing unit drag.

Finally, U.S. Pat. No. 5,191,853, issued to Adler, and U.S. Pat. No. 4,843,988, issued to Clement, teach additional variants of stepped hull bottoms for boats, the purpose of which is to attempt to reduce, to the greatest extent possible, the drag or kinetic friction forces exerted by the adjoining water on the boat hull.

SUMMARY OF THE PRESENT INVENTION

The present invention is a drag-reduction system incorporated within an inwardly stepped underside of a boat hull for reducing a degree of water friction forces exerted upon the boat hull during travel of the boat upon or through a body of water. The system is capable of being employed with a wide variety of boat designs, and most particularly such as a vee shaped hull, a twin catamaran hull and a jet ski hull.

The drag-reduction system includes a plurality of spaced apart rollers which are secured at a generally aft or semi-aft location of the boat hull associated with the inwardly stepped underside. The rollers extending in parallel spaced apart fashion relative to one another and generally perpendicularly to a longitudinal water flow across the boat hull experienced during propulsion of the hull. In some instances, a single set of rollers is adequate. However, the majority of applications include first and second individual pluralities of rollers which may be mounted to first and second angled sides of a vee shaped boat hull or to first and second individual hull portions of a catamaran style boat.

Depending upon the particular embodiment, either a single or pair of elongate and planar shaped belts which can either or not be constructed of water impervious material are provided. The belts each have an established width and define a continuous extending and closed loop which is mounted over an associated plurality of spaced apart rollers. A first linearly extending location of each continuous belt is recessed within the stepped underside of the hull exterior and a second linearly extending location is in contact with the longitudinal water flow.

In the instance of a vee shaped hull configuration, first and second side flush plates are secured beneath the water line of the boat hull and in generally longitudinally extending fashion relative to a central keel line of the boat. An inner flush plate extends likewise longitudinally and in downwardly spaced apart and aligned fashion relative to the keel line. First and second individual drag reduction assemblies are mounted to the first and second angled sides of the vee hull, respectively, and extend from opposite sides of the inner flush plates to the outer positioned first and second side flush plates. Often, a third flush plate is mounted to a stern of the boat hull and is positioned between the first and second flush plates.

In the instance of a catamaran shaped boat, first and second pairs of spaced apart and longitudinally extending flush plates may again be associated with opposite sides of each of the individual hull portions and the first and second drag-reduction assemblies are mounted respectively between the first and second pairs of flush plates.

The drag reduction assembly according to the invention can either be driven or can operate in a free-wheeling fashion in which the kinetic forces of the water drive the assembly. In the instance of a powered variant, driving means are employed for causing the second linearly extending location of each belt to translate in a direction consistent with the longitudinal water flow across the boat hull and at a belt speed equal to or greater than a velocity of the longitudinal water flow. In the instance of a free-wheeling (or non-powered) variant, the belt speed would be either equal to or lesser than the velocity of the longitudinal water flow. In a preferred embodiment, driving means includes at least one drive roller operatively connected to the belt and operable to drive the belt so as to expel water, otherwise forcibly impacting against the hull of the boat, to a location rearward of the boat hull. The drag-reducing system according to the present invention is most applicable to situations where a boat hull is in an "on-plane" condition and in which the hull, or hull portions, are in a slightly upwardly angled position relative to the surface of the water (usually associated with higher speeds) and the second linearly translating location of each belt is arrayed in a substantially coplanar fashion proximate the surface of the water.

BRIEF DESCRIPTION OF THE DRAWINGS

Reference will now be made to the attached drawings, when read in combination with the following specification, wherein like reference numerals refer to like parts throughout the several views, and in which:

FIG. 4 is a rear view of the vee shaped boat hull and showing the arrangement of the first and second drag-reduction assemblies secured against the angled sides of the hull and relative to;

DETAILED DESCRIPTION OF THE PREFERRED EMBODIMENTS

Figure 1:
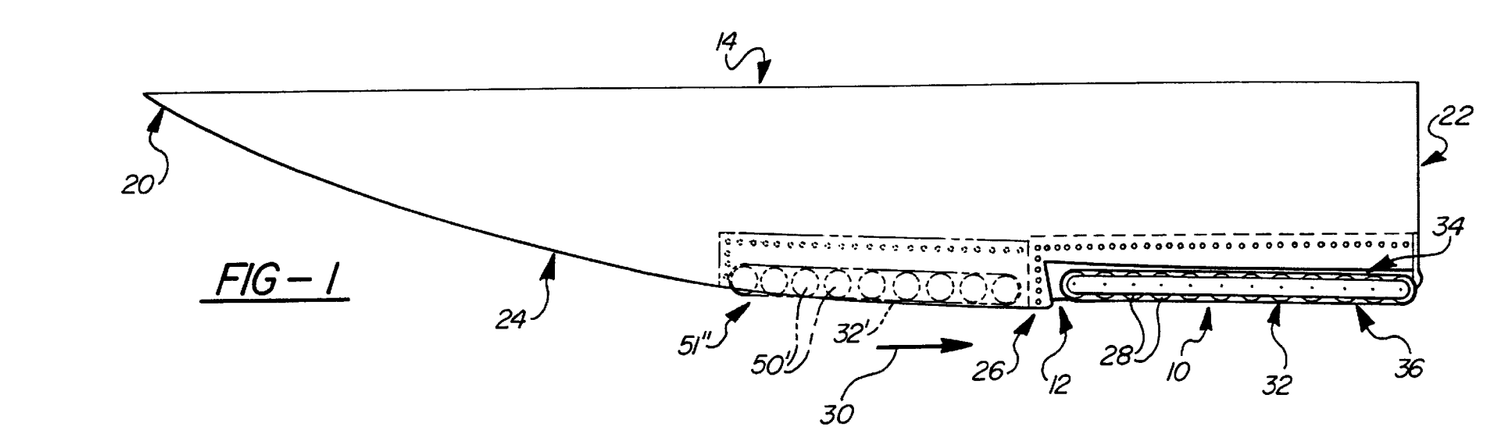
FIG. 1 is a side view of the drag-reduction assembly according to the present invention secured to a boat hull and according to a first specified embodiment.

Referring to FIG. 1, a drag-reduction system is illustrated at 10 for incorporation into an inwardly stepped underside 12 of a boat hull 14 according to the present invention. As will be described in greater detail, the purpose of the drag-reduction system is to reduce a degree of frictional water forces during travel of the boat upon a body of water.

The side profile of FIG. 1 illustrates a very simplified arrangement of a boat hull provided with a single drag-reduction system 10 which is arranged substantially horizontally relative to the underside of the boat hull. In contrast, and as will be explained subsequently in more detail, the second embodiment of FIGS. 3–5 (illustrating a vee shaped boat hull) includes a first angled side 16 and a second angled side 18. Returning to the embodiment of FIG. 1, the boat includes a prow 20, a stern 22, a longitudinally extending keel 24. As is further best illustrated in the side view of FIG. 1, the inwardly stepped underside 12 extends in a generally rearward fashion from a midpoint 26 of the hull 14 to the stern 22.

The drag reduction system 10, as best shown in side profile, includes a plurality of individual and spaced apart rollers 28 which extend in parallel spaced apart fashion relative to one another and in a generally perpendicularly fashion to a longitudinal water flow (evidenced by arrow 30) across the boat hull which is experienced during propulsion of the hull. The rollers 28 may be constructed of any appropriate material, but are typically a lightweight and high-strength steel or steel composite material which is treated so as to be corrosion resistant. It is also envisioned that the rollers can be arranged in other than a parallel spaced apart manner and the rollers can even be provided themselves as bearing assemblies of any length or dimension within the scope of the invention. Additionally, the rollers 28 are typically hollowed internally to reduce their overall weight and to contribute to the buoyancy of the boat or similar type water craft.

An elongate and planar shaped belt 32 is typically constructed of a water impervious mat material (typically a flexible rubber or nylon) and is formed in a closed loop. The belt 32 has an established width (not shown in the side view of FIG. 1) and is mounted over the spaced apart rollers 28 so that a first linearly extending location 34 of the belt 32 is recessed within the stepped underside 12 of the boat hull 14 and a second linearly extending location 36 is in contact with the longitudinal flow of water 30. Although not illustrated, it is understood that the belt may include reinforced apertures or the like which may be engaged by toothed portions extending from the rollers for securing in position the belt onto the rollers. It is also envisioned that other types of securing means, such as a resistant fit or other means for fixedly positioning the belt onto the plurality of rollers, may be employed within the scope of the present invention.

A selected one of the rollers 28, and possibly two rollers, further constitute a drive roller for causing the second linearly extending location of the belt to translate in a direction consistent with the longitudinally flowing water 30 across the boat hull. By virtue of the nature of the material content of the belt, the water flow is caused to be expelled towards the stern. It is further envisioned that the drive rollers may constitute the front most and rear most spaced and parallel extending rollers and that the belt may also be constructed with additional impellents, such as configurations 37 (see FIG. 2) formed at spaced locations along the closed loop of the belt 32 and operable (in a direction along the second linear location 36. It is also contemplated that, through operation of the rollers and belt alone, some propulsion of the water craft is accomplished at low speeds and without the additional assistance of a motor and propeller. It is also possible in a separate variant that the belt and roller assemblies may be completely free wheeling and will achieve a sufficient translational speed by virtue of the main drive capabilities of the boat. Additional description of the functioning of the drag-reduction systems will be further explained with reference to succeeding FIGS. 3–12.

Additional features of the drag reduction system 10 shown in FIG. 1 includes the provision of flush plates secured around a periphery of the inwardly stepped underside 12. As is again best shown from the side view of FIG. 1, a first side flush plate 38 is illustrated which is secured to a selected side of the boat hull and extends downwardly to partially enclose the stepped recess 12. It is understood that a second and identically constructed side plate (not shown) is also provided for an opposite side of the boat hull and a third and interconnecting flush plate is shown at 40 for securing to a corresponding stern edge of the boat hull. The flush plates are further preferably constructed of a fiberglass or similar type material, however they can likewise be constructed of metal or any other suitable material exhibiting the necessary characteristics of strength and resiliency.

Figure 2:
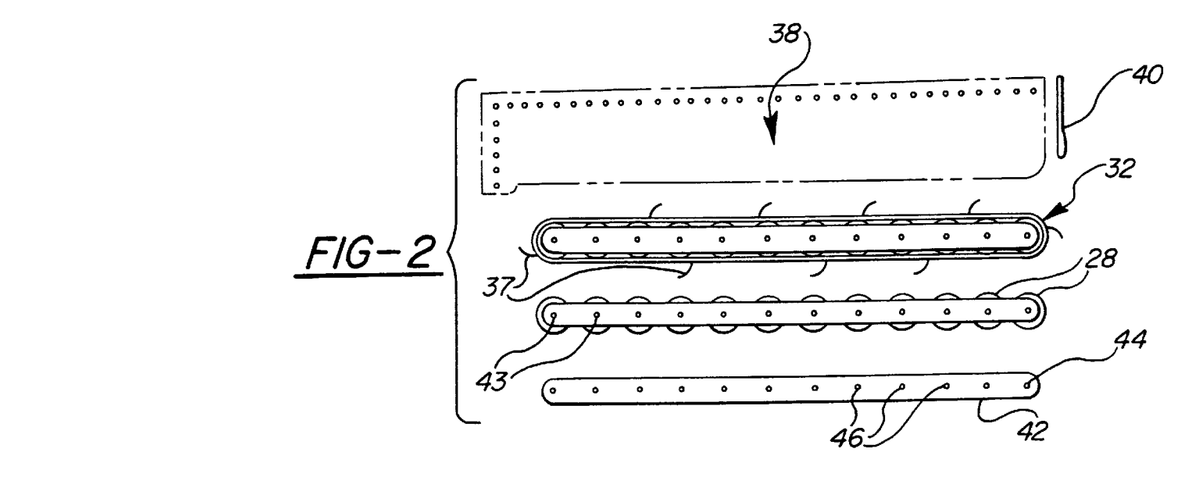
FIG. 2 is an exploded view of the drag-reduction assembly according to FIG. 1 and illustrating in side profile the pluralities of rollers, the closed loop belt, the flush plate and the tensioning plate.

A tensioning and support plate 42 is provided and includes at least one slot 44, and preferably additional slots 46. The tensioning plate 42 functions to engage between laterally outwardly extending pins or other connecting means (see at 43) of the individual rollers 28 and the corresponding edges of the flush plates. The purpose of the tensioning plate is to support the roller tension vis-à-vis movement of the belt and to adjust a degree of difficulty in permitting rotation of individual rollers 28 based upon desirable operating conditions. The tensioning is capable of being adjusted by affecting a degree of compression between inner edges of each slot 44 and/or 46 and the corresponding outer edges of the pins 43.

Figure 3:
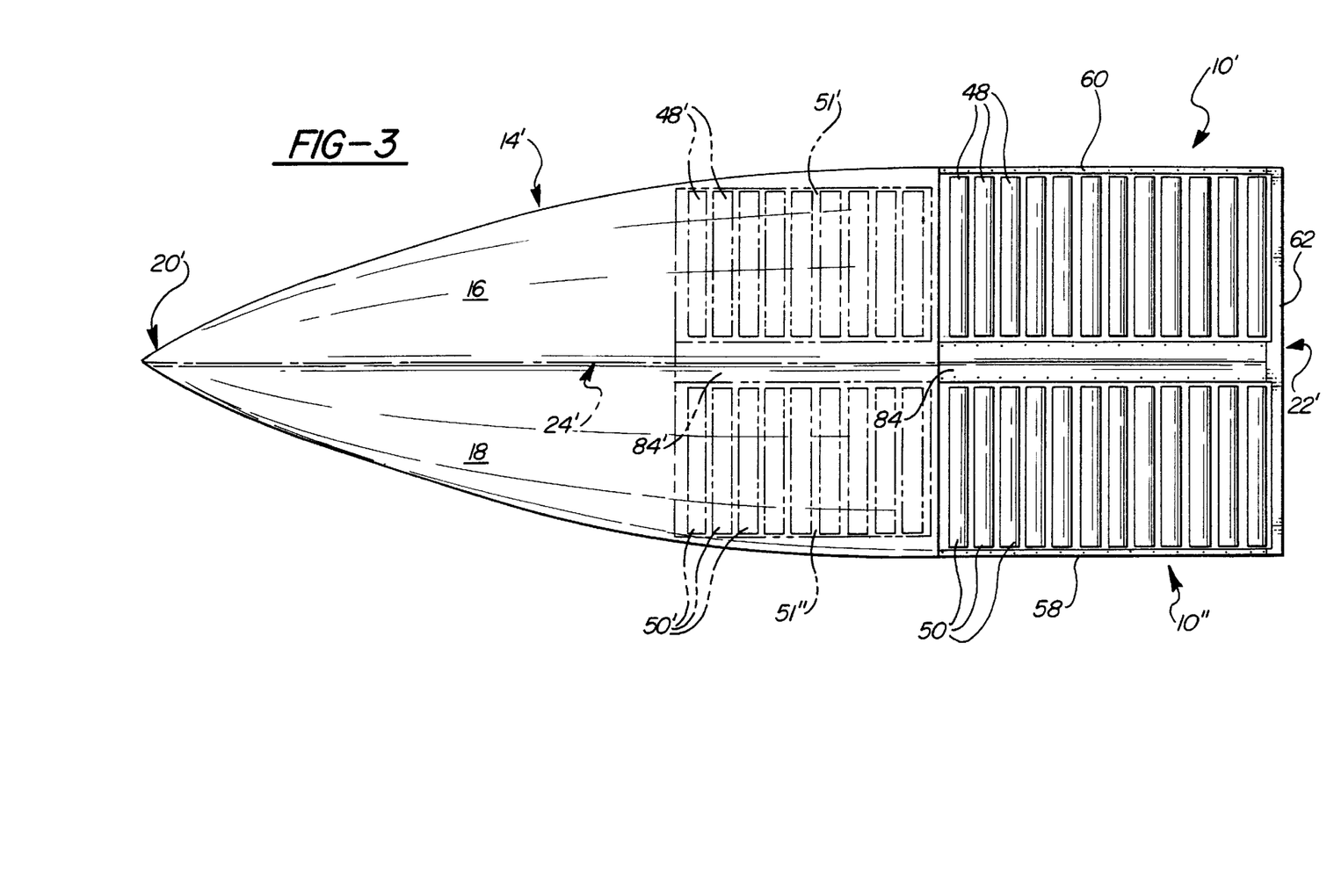
FIG. 3 is bottom view of a vee shaped boat hull according to a further embodiment and illustrating first and second drag-reduction assemblies arranged in side by side fashion according to the present invention.
Figure 4:
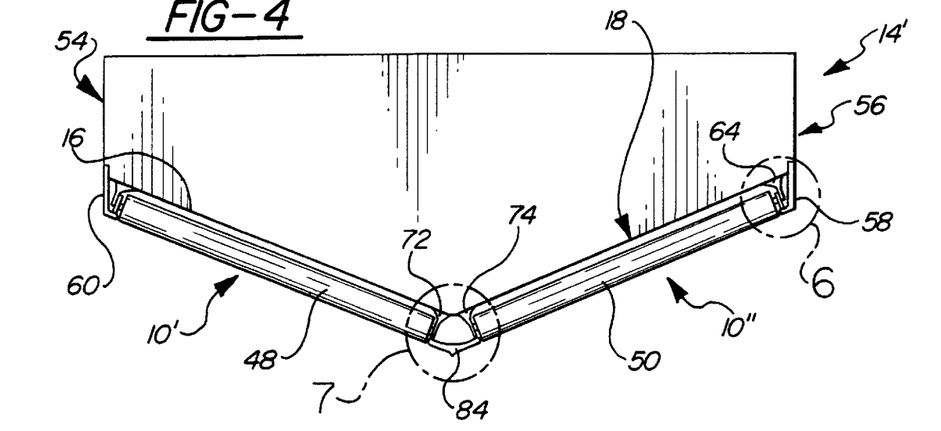
Figure 5:
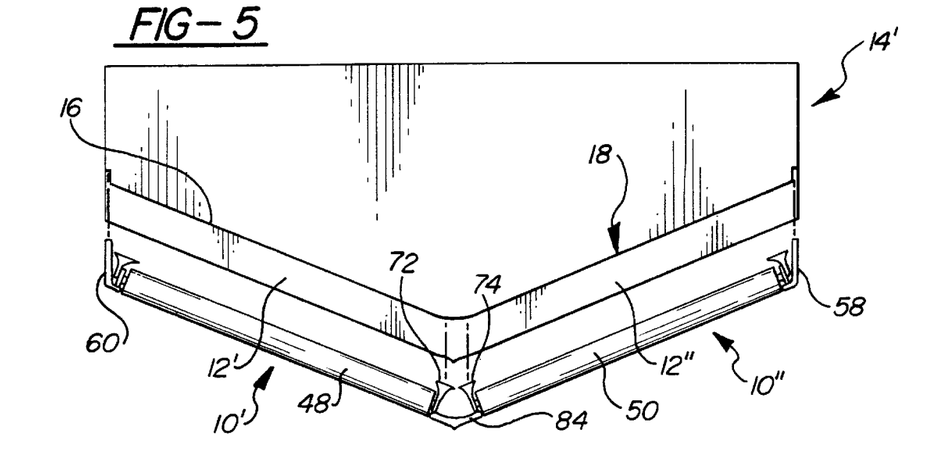
FIG. 5 is an exploded view of FIG. 4 and illustrating in better detail the configuration of the inwardly stepped underside of the vee shaped boat hull.

As is better illustrated in FIGS. 3, 4 and 5, a boat hull 14' according to a further embodiment is a vee shaped hull with a first angled and longitudinally extending side 16 and a second angled and longitudinally extending side 18 and to which are secured a first drag-reduction unit 10' and a second drag-reduction unit 10". The vee shaped hull 14' further also includes such features as a prow 20', a stern 22' and a longitudinally extending keel 24' as also shown in FIG. 1. Each of the individual drag-reduction units 10' and 10" provides elements similar in most regards to those described with reference to the initial embodiment of FIGS. 1 and 2. Specifically, the first drag-reduction unit 10', positioned along the first angled side 16, includes a plurality of spaced apart and elongate extending rollers 48 and the second unit 10", positioned along the second angled side 18, includes a second plurality of rollers 50. Referring again to the exploded view of FIG. 5, the first and second angled sides 16 and 18 include, respectively, first and second angled and inwardly stepped recesses 12' and 12" for seating the first and second pluralities of rollers 48 and 50. Although not included for purposes of ease of illustration in FIGS. 3–5, first and second elongate and planar shaped belts of flexible nylon or rubber or other adequate material are provided (and as described in the first embodiment) for mounting around the first and second pluralities of spaced apart rollers 48 and 50 and is dimensioned so as to substantially cover the elongated rollers as illustrated in FIGS. 3–5.

As is also viewed in phantom in FIGS. 1 and 3, additional drag-reduction units can be incorporated into the boat hull at a forward location relative to the units 10' and 10" (see specifically FIG. 3). In this instance, additional drag-reduction units are shown at 51' and 51" and include, respectively, additional pluralities of rollers 48' and 50'. As is also shown in the side view of FIG. 1, the reduction unit 51" with rollers 50' also includes a belt 32' positioned in a forwardly and slightly higher horizontal extending location relative to the rearwardly positioned assembly 10. It is further envisioned that the recessed depth of any such belt can vary from a flush mount to the bottom of the hull to being recessed into an inwardly stepped interior located on an external face of the hull bottom.

Figure 6:
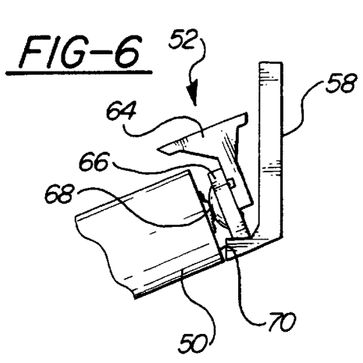
FIG. 6 is an enlarged partial view taken along line 6—6 of FIG. 4 of a combination side flush plate and side bracket/side support portion for supportably engaging a selected end of a plurality of rollers of a drag-reduction assembly.

Referring to FIG. 6, an enlarged view is shown at 52 of a selected edge alignment between a roller 50 and a flush plate extending along a selected side of the boat hull. Specifically, the hull shown in rear profile in FIG. 4 may include a first side edge 54 and a second opposite side edge 56. The flush plate in FIGS. 4–6, shown at 58, is secured to the second side edge 56 of the boat hull and extends downwardly therefrom. An identical flush plate is illustrated in FIGS. 4 and 5 at 60 and extends in parallel fashion relative to the side edge 54 of the hull. Referring to FIG. 3, a third flush plate 62 is illustrated extending along the stern 22' of the boat hull and is capable of either or not interconnecting with the flush plates 58 and 60 so as to define a generally "U" shaped enclosure around the inwardly stepped underside of the hull.

As is again best shown in the enlarged view of FIG. 6, a corresponding end of a selected roller 50 is rotatably secured in the proximity of the flush plate 58 by means of a side bracket 64 which is secured to a generally underside location of the angled side 18 of the boat hull (see again FIG. 4) and in proximity to the flush plate 58. Located between the side bracket 64 and flush plate 58 is a side support portion enclosing therein a bearing 66 for rotatably securing, via a pressure and self-lubricating bearing 68, an associated end 70 of the roller 50. It is further anticipated that either a single elongated side bracket 64, and side support portion 66 may be provided with the flush plate 58 or, alternatively, a plurality of individual spaced apart and overall longitudinally extending brackets and rows of outer side support portions may be employed for respectively mounting individual ends of each of the rollers 50. With respect to the flush plate 60 and the corresponding ends of each of the rollers 48, identical structure is employed as shown in the enlarged view of FIG. 6 for securing the rollers to the flush plate 60 and along the first selected side edge 54 of the boat hull.

Figure 7:
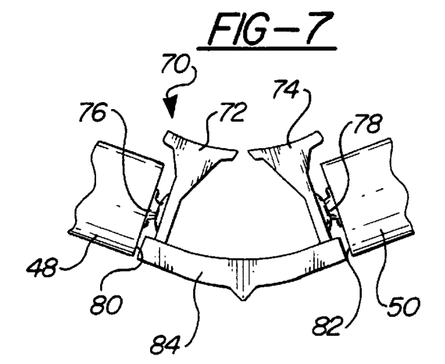
FIG. 7 is an enlarged partial view taken along line 7—7 of FIG. 4 of an inner flush plate supported by rows of supports and providing substantially flush edge covering the space existing between the first and second angled pluralities of rollers, the rollers being secured to the rows of supports.

Referring to FIG. 7, an enlarged view is shown at 70 of an inner flush plate assembly for securing corresponding inner edges of the rollers 48 and 50, belonging to the first and second units 10' and 10", to a generally centralized longitudinal location of the hull. First and second inner supports are shown at 72 and 74 which secure to the boat hull, such as through bolts or the like, proximate in location to its central keel. The inner supports 72 and 74 may also be formed as single elongated elements or may be provided as pluralities of spaced apart supports which extend from the intermediate location of the boat hull longitudinally to its stern edge. Additional bearings 76 and 78 extend laterally outwardly from the first and second inner supports 72 and 74, respectively, and secure associated ends 80 and 82 of the respective pluralities of rollers 48 and 50 to inner flush plate assembly.

Mounted to the inner supports 72 and 74 in spaced apart fashion is an elongate and curved inner flush plate 84 which is also preferably constructed of a fiberglass or like material. The configuration of the flush plate 84 is such that covers the central area between the rollers 48 and 50 and prevents water flow from entering a central slot defined within that area. The flush plate 84 also lies closely to the opposing edges 80 and 82 of the rollers 48 and 50, terminating at the bottom edge of the belt corresponding with its second linearly extending location. As is also shown in FIG. 3, an additional flush plate 84' is illustrated in phantom and is also utilized for supporting the additional drag reduction units 51' and 51" located forwardly of rear units 10' and 10".

Figure 9:
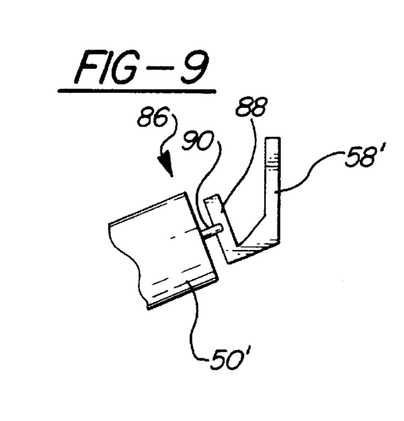
FIG. 9 is an enlarged partial view similar to that shown in FIG. 6 and illustrating a further variant for rotatably supporting a selected end of a plurality of rollers directly to an associated flush plate.
Figure 10:
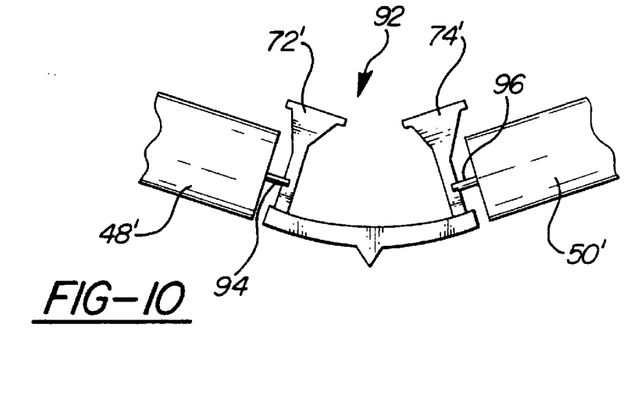
FIG. 10 is an enlarged partial view of an inner flush plate, similar to that shown in FIG. 7, and illustrating associated ends of the angled pluralities of rollers secured to the rows of inner flush plates supports according to a further embodiment.

Referring to FIG. 9, an alternate view of a flush plate connection is shown at 86, similar to the variant of FIG. 6, and includes a flush plate 58' from which extends a bracket 88. The roller is again shown at 50' and defined at its end is a projecting pin 90 or other connecting means which seats within an aperture in the bracket 88. Referring to FIG. 10, a corresponding alternate view of an interior flush plate is shown at 92 and includes inner supports 72' and 74' which again directly receive pins 94 and 96 or other connecting means extending from the opposing ends of each of the roller 48' and 50'. The variant of FIGS. 9 and 10 is thus a simplification from that of FIGS. 6 and 7 in that it does away with either the type of bearing structure illustrated in the previous embodiment or bracket 64.

Figure 11:
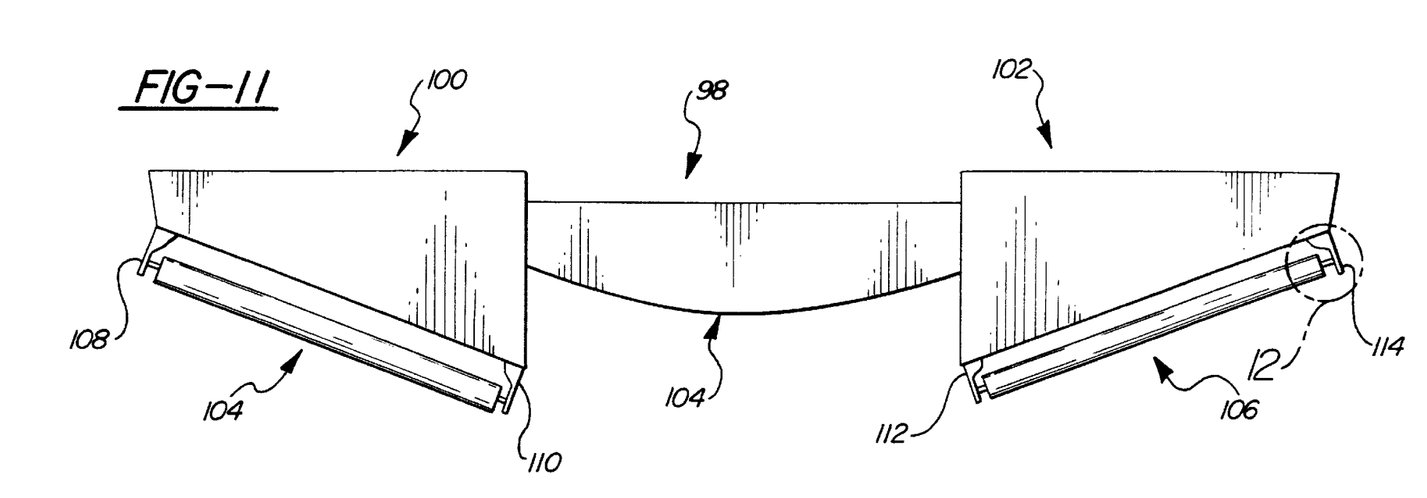
FIG. 11 is a rear view of first and second drag-reduction systems according to the present invention which are secured to respective hull portions of a catamaran style boat.
Figure 12:
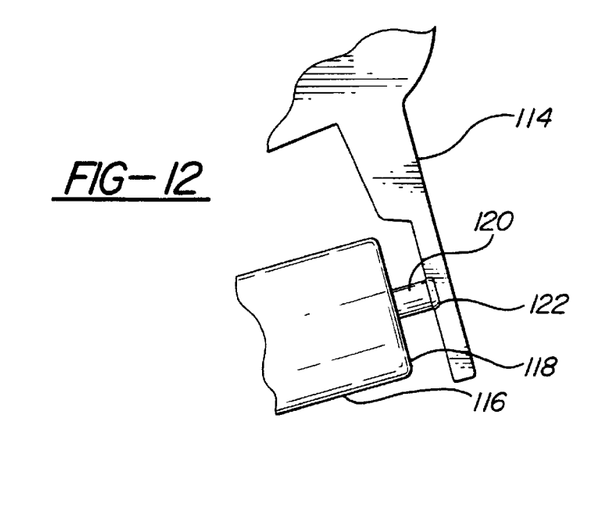
FIG. 12 is an enlarged partial view taken along lines 12—12 of FIG. 11 and illustrating a selected end of a plurality of rollers rotatably supported upon an associated flush plate secured to a side a catamaran hull portion.

Referring to FIGS. 11 and 12, a catamaran style boat is illustrated at 98 and includes a first hull 100, a second hull 102 extending in spaced apart and parallel fashion from the first hull 100, and a transverse interconnecting portion 104. The conventional designs of catamaran style boats are further well known in the art, accordingly the rear side plan view illustrated in FIG. 11 is sufficient for the description of the present invention.

First and second drag-reduction systems 104 and 106 (illustrated again by rotatably mounted rollers) are incorporated, respectively, into underside locations of the first and second hulls 100 and 102, respectively. Although not illustrated in FIG. 11, it is further understood that the catamaran boat hull portions may include inwardly stepped undersides within the scope of the invention. It is also envisioned that, in addition or instead of a stepped underside formed in each of the catamaran hulls 100 and 102, flush plates may be installed to form either a substantially "U" shaped and three sided or a four sided and completely enclosed area. Illustrated in FIG. 11 are longitudinally extending and side flush plates 108 and 110, associated with the first hull 100, and side flush plates 112 and 114, associated with the second hull 102. It is further understood that transverse extending flush plates (not illustrated) may also be employed along either or both the rear and/or front edges of the side flush plates associated with either or both hull portions.

Referring to FIG. 12, an enlarged view is shown of the rotatably supported connection between a selected roller 116 of the second drag-reduction system 106 and the side flush plate 114. As previously described, the roller 116 may include, at its selected end 118, a laterally extending pin 120 (or other connecting means) or other mounting portion which is received within a like aperture 122 formed in the flush plate 114. It is well understood that the manner and style of securing the elongated rollers in the present invention in an appropriate manner is well within the capabilities of those skilled in the art, such as through the use of impact resistant bearings and the like.

Figure 8:
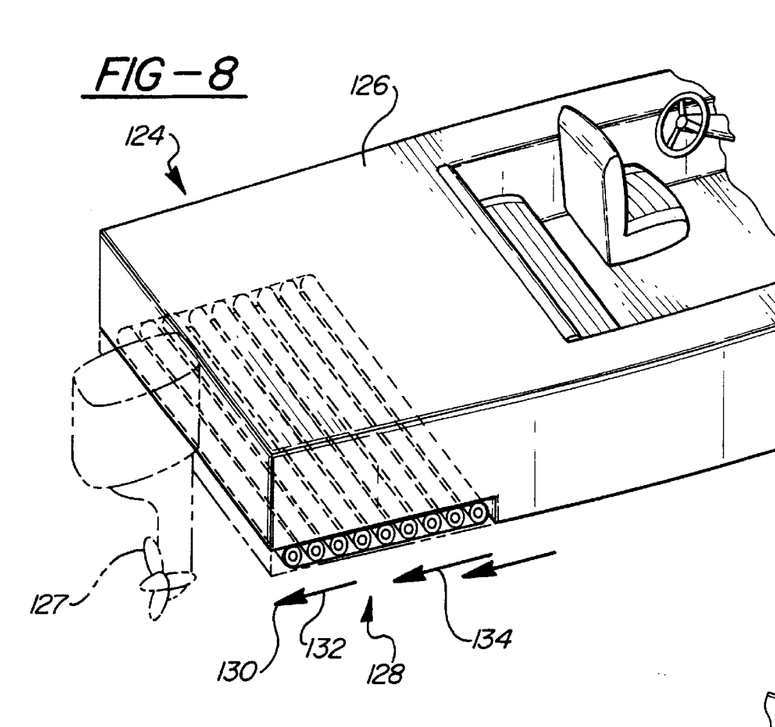
FIG. 8 is a partial operative view of a further embodiment and illustrating a single drag-reduction system in an on-plane condition.

Finally, referring to FIG. 8, an example of an "on-plane" condition at 124 and experienced by a boat 126 is illustrated such as a hydroplane style boat. A motor 127 (illustrated in phantom) or other drive means associated with the boat, is activated to drive the boat at a sufficient speed that the bow begins to lift out of the water and the stern begins to angle lower in the water than when the craft is at a stand-still but to a lesser amount than a catamaran and even lesser than a "V" bottom boat. At this point, translation of the drag-reduction system (illustrated by a single such system at 128), is such that the second (or lower) location 130 translates in a direction indicated by arrow 132, consistent with the longitudinal flow of water 134 and reduces drag forces or kinetic friction associated at the submerged area of the boat and by deflecting as much of the impacting water flow to a location rearward of the stern of the boat.

Having described my invention, it will become apparent that it discloses a drag-reduction system for use by various types of small and larger size boats which is not known in that prior art. Additional preferred embodiments will also become evident to those skilled in the art to which it pertains without deviating from the scope of the appended claims.

I claim:

1. A drag-reduction system incorporated within an inwardly stepped underside of a boat hull for reducing a degree of frictional water forces exerted upon the boat hull during travel of the boat upon a body of water, said system comprising:
   a plurality of spaced apart rollers which are secured between brackets at a generally aft location of the boat hull associated with the inwardly stepped underside, said rollers extending in spaced apart fashion relative to one another, a longitudinal water flow across the boat hull being experienced during movement of the hull;
   an elongate and planar shaped belt, said belt having an established width and defining a continuous extending and closed loop which is mounted over said plurality of spaced apart rollers, a first linearly extending location of said continuous belt being recessed within the stepped underside of the hull, a second linearly extending location of said continuous belt being in contact with said longitudinal water flow; and
   means for causing said second linearly extending location of said belt to translate in a direction consistent with the longitudinal water flow across
   the boat hull and at a belt speed equal to or lesser than a velocity of the longitudinal water flow.

2. The drag-reduction system as described in claim 1, said brackets further comprising side brackets secured to and extending from the boat hull in opposing fashion, side support portions being interengaged with said side brackets, opposite ends of said rollers being rotatably secured to said side support portions.

3. A drag-reduction system reducing a degree of frictional water forces exerted upon the boat hull during travel of the boat upon a body of water, said system comprising:
   at least one plurality of spaced apart rollers secured at a generally aft location of the boat hull by side brackets extending downwardly from the boat hull in opposing fashion, said rollers extending in spaced apart fashion relative to one another, a longitudinal water flow across the boat hull being experienced during movement of the hull;
   at least one elongate and planar shaped belt, said belt having an established width and defining a continuous extending and closed loop which is mounted over a said plurality of spaced apart rollers, a first linearly extending location of said continuous belt being positioned at a location semi-isolated from direct frictional water forces, a second linearly extending location of said continuous belt being in contact with said longitudinal water flow and parallel to a bottom of the boat hull; and
   means for causing said second linearly extending location of each of said belts to translate in a direction consistent with the longitudinal water flow across the boat hull and at a belt speed equal to or lesser than a velocity of the longitudinal water flow.

4. The drag-reduction system as described in claim 3, said flush plates further comprising first and second plates associated with first and second sides of the hull and between which said rollers are arrayed, a third plate interposing between ends of said first and second plates and forming a substantially "U" shape and associated with a rear side of the hull.

5. The drag-reduction system as described in claim 3, further comprising means for establishing a tension between said belt and rollers.

6. The drag-reduction system as described in claim 5, said tensioning means further comprising a plate and including at least one slot formed therein, said slot interengaging at least one selected roller for establishing an overall tension for all of said rollers.

7. The drag-reduction system as described in claim 1, further comprising side brackets secured to and extending from the boat hull in opposing fashion, side support portions being interengaged with said side brackets, opposite ends of said rollers being rotatably secured to said side support portions.

8. The drag-reduction system as described in claim 1, said plurality of rollers each further comprising a lubricated bearing.

9. A drag-reduction system reducing a degree of frictional water forces exerted upon the boat hull during travel of the boat upon a body of water, said system comprising:

at least one plurality of spaced apart rollers secured at a generally aft location of the boat hull, said rollers extending in spaced apart fashion relative to one another, a longitudinal water flow across the boat hull being experienced during movement of the hull;

at least one elongate and planar shaped belt, said belt having an established width and defining a continuous extending and closed loop which is mounted over a said plurality of spaced apart rollers, a first linearly extending location of said continuous belt being positioned at a location semi-isolated from direct frictional water forces, a second linearly extending location of said continuous belt being in contact with said longitudinal water flow and parallel to a bottom of the boat hull; and means for causing said second linearly extending location of each of said belts to translate in a direction consistent with the longitudinal water flow across the boat hull and at a belt speed equal to or lesser than a velocity of the longitudinal water flow.

10. A combination boat hull and drag-reduction system for reducing a degree of frictional water forces exerted upon the boat hull during travel of the boat upon a body of water, said system comprising:

said boat hull further including a vee shaped bottom having at least a first angled side and a second angled side, an inwardly stepped recesses being defined, respectively, within both said first and second angled sides and extending from an intermediate location to a stern of said hull;

said drag-reduction system including first and second pluralities of spaced apart rollers secured at a generally aft location and within said first and second angled sides said boat hull associated with said inwardly stepped underside, said pluralities of rollers extending in spaced apart fashion relative to one another, a longitudinal water flow across the boat hull being experienced during propulsion of the hull;

first and second elongate and planar shaped belts, said belts having an established width and defining a continuous extending and closed loop which are mounted over said associated pluralities of spaced apart rollers, a first linearly extending location of each of said continuous belts being recessed within said stepped underside of said associated angled hull side, a second linearly extending location of said continuous belts being in contact with said longitudinal water flow; and driving means for causing said second linearly extending location of said belts to translate in a direction consistent with the longitudinal water flow across the boat hull and at a specified belt speed relative to the longitudinal fluid flow.

11. The combination boat hull and drag-reduction system as described in claim 10, said belt further comprising a water impervious material.

12. The drag-reduction system as described in claim 10, the hull further being adapted to include a plurality of drag-reduction systems along each of said first angled side and said second angled side.

13. A combination boat hull and drag-reduction system for reducing a degree of frictional water forces exerted upon the boat hull during travel of the boat upon a body of water, said system comprising:

said boat hull further including a catamaran boat hull with a first hull extending in spaced apart and parallel extending fashion from a second and substantially identically constructed hull, an inwardly stepped recesses being defined, respectively, within both said first and second hulls and extending from an intermediate location to a stern of said hulls, said first and second hulls adapted to being interconnected by a transverse extending portion of said catamaran;

said drag-reduction system including first and second pluralities of spaced apart rollers secured at a generally aft location and within said first and second hulls of said boat hull associated with said inwardly stepped recesses, said pluralities of rollers extending in spaced apart fashion relative to one another, a longitudinal water flow across said catamaran boat hulls being experienced during movement of said hulls;

first and second elongate and planar shaped belts, said belts having an established width and defining a continuous extending and closed loop which are mounted over said associated pluralities of spaced apart rollers, a first linearly extending location of each of said continuous belts being positioned at a location semi-isolated from direct frictional water forces of said associated hull, a second linearly extending location of said continuous belts being in contact with said longitudinal water flow; and driving means for causing said second linearly extending locations of said belts to translate in a direction consistent with the longitudinal water flow across the boat hull portions and at a specified belt speed relative to the longitudinal water flow.

14. The combination boat hull and drag-reduction system as described in claim 13, said belt further comprising a water impervious material.

15. The drag-reduction system as described in claim 13, further comprising a plurality of drag-reduction systems along each of said first hull and said second hull.

16. A drag-reduction system incorporated within an inwardly stepped underside of a boat hull for reducing a degree of frictional water forces exerted upon the boat hull during travel of the boat upon a body of water, said system comprising:

the hull further being adapted to include a vee shaped boat hull having a first angled side which incorporates a first of said drag-reduction systems and a second angled side which incorporates a second of said drag-reduction systems;

a plurality of spaced apart rollers secured at a generally aft location of the boat hull associated with the inwardly stepped underside, said rollers extending in spaced apart fashion relative to one another, a longitudinal water flow across the boat hull being experienced during movement of the hull;

an elongate and planar shaped belt, said belt having an established width and defining a continuous extending and closed loop which is mounted over said plurality of spaced apart rollers, a first linearly extending location of said continuous belt being recessed within the stepped underside of the hull, a second linearly extending location of said continuous belt being in contact with said longitudinal water flow; and means for causing said second linearly extending location of said belt to translate in a direction consistent with the longitudinal water flow across the boat hull and at a belt speed equal to or lesser than a velocity of the longitudinal water flow.

17. The drag-reduction system as described in claim 16, further comprising:

first and second flush plates associated with first and second sides of the hull and a third flush plate associated with a rear side of the hull and positioned between ends of said first and second side flush plates, said flush plates adapted to encircle the inwardly stepped underside of the boat hull;

an inner flush plate adapted to be secured in longitudinally extending and downwardly spaced fashion to a keel of the boat hull from an intermediate location to a stern of the hull; and said first drag-reduction system adapted to being secured to the first angled side of the boat hull and between said first flush plate and a first selected side of said inner flush plate, said second drag-reduction system adapted to being secured to the second angled side between said second flush plate and a second selected side of said inner flush plate.

18. The drag-reduction system as described in claim 17, further comprising first and second rows of outer side supports adapted to extend along the first and second sides of the hull in inwardly spaced proximity to said first and second flush plates, additional rows of inner supports securing said inner flush plate and being arrayed in opposing fashion relative to said first and second rows of outer side supports, opposing ends of pluralities of said rollers associated with said first and second drag-reduction systems being rotatably secured, respectively, to said rows of outer side supports and said oppositely facing rows of inner side supports.

19. A drag-reduction system incorporated within an inwardly stepped underside of a boat hull for reducing a degree of frictional water forces exerted upon the boat hull during travel of the boat upon a body of water, said system comprising:

the hull further being adapted to include a catamaran boat hull with a first hull extending in spaced apart and parallel extending fashion from a second and substantially identically constructed hull, the first and second hulls adapted to being interconnected by a transverse extending portion of the catamaran, said first hull incorporating a first of said drag-reduction systems and said second hull incorporating a second of said drag-reduction systems;

a plurality of spaced apart rollers secured at a generally aft location of the boat hull associated with the inwardly stepped underside, said rollers extending in spaced apart fashion relative to one another, a longitudinal water flow across the boat hull being experienced during movement of the hull;

an elongate and planar shaped belt, said belt having an established width and defining a continuous extending and closed loop which is mounted over said plurality of spaced apart rollers, a first linearly extending location of said continuous belt being recessed within the stepped underside of the hull, a second linearly extending location of said continuous belt being in contact with said longitudinal water flow; and means for causing said second linearly extending location of said belt to translate in a direction consistent with the longitudinal water flow across the boat hull and at a belt speed equal to or lesser than a velocity of the longitudinal water flow.

20. The drag-reduction system as described in claim 19, further comprising:

a first pair of spaced apart and longitudinally extending flush plates associated with first and second sides of said first hull and a second pair of spaced apart and longitudinally extending flush plates associated with first and second sides of said second hull, said first and second pairs of flush plates being adapted to extend from intermediate locations of said first and second hulls to a stern of each of the hull;

opposing ends of pluralities of said rollers associated with said first and second drag-reduction systems being rotatably secured, respectively, between said first and second pairs of longitudinally extending flush plates.

* * * * *

UNITED STATES PATENT AND TRADEMARK OFFICE
CERTIFICATE OF CORRECTION

PATENT NO.    : 6,116,176
DATED         : September 12, 2000
INVENTOR(S)   : Craig S. Jones It is certified that error appears in the above-identified patent and that said Letters Patent is hereby corrected as shown below:

Column 8,
Lines 12-17, delete "brackets further comprising side brackets...side support brackets", and insert -- means for causing said belt to translate further comprising at least one drive roller in operative connection with said pluraluity of rollers --.
Lines 18-40, delete the entire contents of claim 3 and insert -- The drag-reduction system as described in Claim 1, further comprising flush plates secured around a periphery of the inwardly stepped underside of the boat hull and surrounding side rollers and belts --.
Line 56, after "Claim 1," insert -- said brackets --.

Column 9,
Line 2, after "hull", insert -- by side brackets extending downwardly from the boat hull in opposing fashion --.

Signed and Sealed this

Twentieth Day of December, 2005

JON W. DUDAS
*Director of the United States Patent and Trademark Office*